Feb. 17, 1931.          H. F. PAYNE          1,793,130
                         SPARK PLUG
                      Filed May 1, 1930

Hugh F. Payne INVENTOR
BY Harry A. Yerkes, Jr.
ATTORNEY

Patented Feb. 17, 1931

1,793,130

UNITED STATES PATENT OFFICE

HUGH F. PAYNE, OF ASTORIA, NEW YORK, ASSIGNOR TO THE B. G. CORPORATION, OF NEW YORK, N. Y., A CORPORATION OF NEW YORK

SPARK PLUG

Application filed May 1, 1930. Serial No. 448,893.

The object of the invention is to provide simple, novel and effective means for securing a gas-tight joint about the spindle of a spark-plug. This is accomplished by means of a hollow metallic part surrounded by the insulating sleeve and a central metallic part which, as the result of being driven or forced lengthwise in the hollow part, expands the latter sufficiently to grip the insulating sleeve between the hollow part and the body piece through which the spindle passes, thereby producing the gas-tight joint. One of the parts referred to is the spindle.

In the preferred form of the invention the hollow part is a quill and the spindle, which passes through the quill is of slightly different diameters in its upper and lower portions so that when the smaller portion is introduced into the quill and the spindle is then driven to its assembled position the quill is expanded by the larger diameter of the spindle with the result stated.

In another form of the invention the spindle is made hollow and a plug or its equivalent is driven into the spindle so as to cause it to grip the insulating sleeve against the surrounding body piece.

Other features and advantages of the invention will appear.

In the accompanying drawings forming part hereof:

Figure 1:
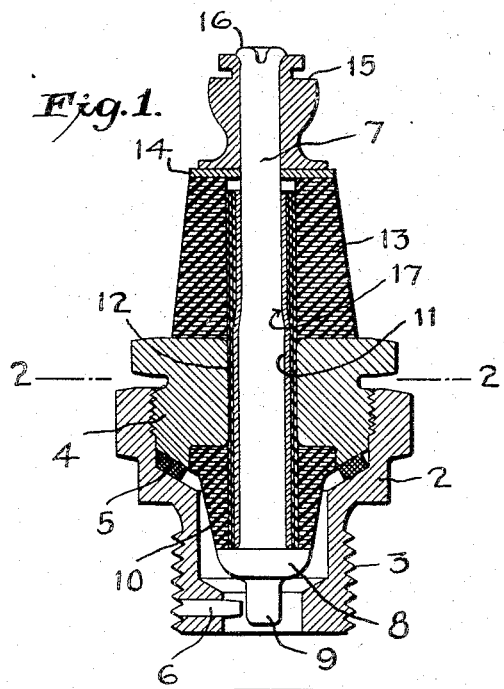
Fig. 1 is a longitudinal section through a spark-plug embodying the preferred form of the invention.
Figure 2:
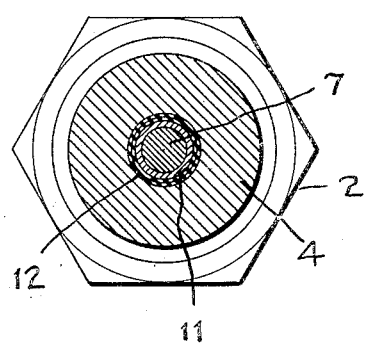
Fig. 2 is a cross-section taken on the line 2—2 of Fig. 1.

Fig. 1 illustrates a spark-plug of the "two-piece" type which can be taken apart for inspection and cleaning. The body consists of a shell 2 having the usual external screw thread 3, and a bushing 4 which is screwed into the upper end of the shell against an interposed ring 5. The shell has an electrode 6.

The spindle 7, which passes through the central opening of the bushing, has a head 8 at its lower end and carries the other electrode or sparking point 9. Customary insulation 10 consisting of mica discs is interposed between the head 8 and the under side of the bushing.

A metallic quill 11 tightly encircles the spindle and extends from the head 8 to a point considerably above the bushing. This quill is surrounded in turn by an insulating sleeve 12 of mica rolled up into this form, and the intermediate portion of this sleeve is gripped between the quill and the surface of the opening through the bushing.

The spindle 7, quill 11 and sleeve 12, when they project above the bushing, are surrounded by customary mica disc insulation 13, on top of which is a washer 14, a terminal 15 being placed over the upper end of the spindle and the extremity 16 of the latter being riveted over on the terminal.

The spindle 7 has portions of different diameters, the portion which is above the head and which passes through the bushing being slightly larger than the portion of the spindle which is above the bushing. The shoulder or taper 17 has been exaggerated in the drawing for purpose of clearness. In practice a scarcely discernible difference in diameter is sufficient. The larger portion of the spindle is a little larger than the initial inside diameter of the quill 11, so that when the spindle is driven upward through the quill it expands the latter slightly, but this expansion or tensioning is sufficient to grip the insulating sleeve 12 powerfully and very tightly between the quill and the surface bounding the opening through the bushing 5, the quill also hugging the spindle very tightly. In this way a reliable gas-tight joint is easily secured.

In assembling this spark-plug, the quill 11 with the insulating sleeve 12 about it is inserted in the opening of the bushing and the parts are supported in proper relation. The mica discs forming the insulation 10 are put in place about the portions of the quill and the insulating sleeve which project below the bushing. Then the narrower end of the spindle is introduced into the lower end of the quill, and by blows or pressure applied to the head 8 the larger diameter of the spindle is forced into the quill, causing the sleeve to become gripped in the manner which has been described.

It will be observed that because of the nature of this invention the gas-tight joint does not have to be produced by pressure transmitted through the insulation 10. Hence, this insulation is not placed under heavy initial compression. This is desirable because under the heat of the engine this mica insulation tends to expand even more than the metal of the spindle, and such effort of the mica to expand, if added to a heavy initial compression, sometimes breaks the spindle at the head or may permanently stretch the spindle, producing what is known as "necking".

In this connection, additional advantage can be obtained by making the spindle of steel or ferrous metal and the quill of copper. The steel spindle then affords the strength for holding the parts of the spark-plug together so that they will not become loose as the result of expansion stresses, while the copper quill serves as an excellent heat conductor to draw heat away from the parts exposed to high temperature and thereby reduce the stresses.

Figure 3:
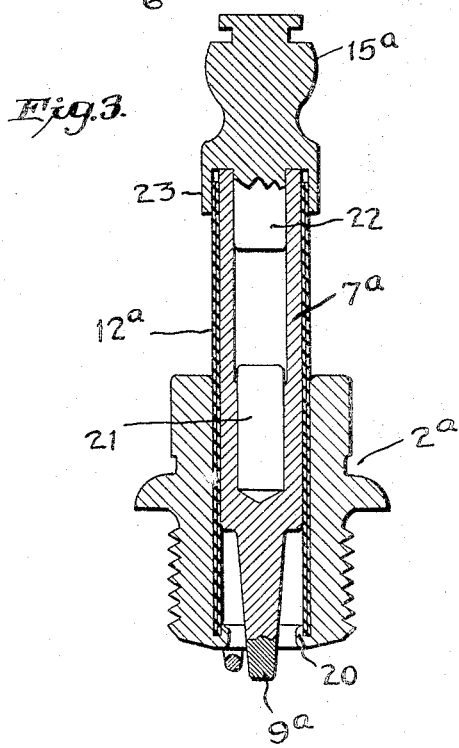
Figs. 3 and 4 are longitudinal sections through two other forms of the invention.
Figure 4:
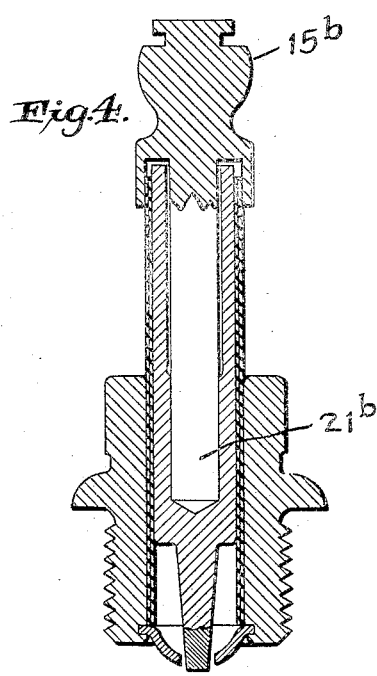

Figs. 3 and 4 show applications of the invention to spark-plugs of the "one-piece" type, that is to say spark-plugs which are not intended to be taken apart.

In Fig. 3 the spark-plug comprises a shell 2ª having a straight opening through it, the opening being reduced however at the lower end by a grooved shoulder 20, against which rests the lower end of the insulating sleeve 12ª. The spindle 7ª is made hollow from its upper end downward to a point approximately midway of the height of the shell. Below this region the spindle is made of considerably smaller diameter and terminates in the sparking point 9ª, which may be welded on.

The lower portion of the cavity in the spindle is preferably smaller than the upper part, and into this narrow part there is driven a plug 21 of slightly larger diameter, so that the wall of the spindle is slightly expanded or tensioned so as to grip the sleeve 12ª against the surface of the bore of the shell, producing the gas-tight joint which has been described.

This spark-plug is completed by driving the plug end 22 of a terminal 15ª into the upper end of the cavity in the spindle, this terminal having a skirt 23 which embraces the upper end of the insulating sleeve 12ª. The spindle may be of copper or of ferrous metal.

The construction shown in Fig. 4 is generally similar to the last, but the plug of the last form, the driving of which into the lower part of the hollow spindle results in the gas-tight joint, is made as an extension or shank 21ᵇ of the terminal 15ᵇ.

Other forms and applications of the invention will suggest themselves to those skilled in the art.

What is claimed as new is:

1. In a spark-plug of the type having a metallic spindle carrying one of the electrodes, a body piece through which the spindle passes and an insulating sleeve between the spindle and the body piece; means affording a gas-tight joint around the spindle, comprising a hollow part inside the insulating sleeve, and a central part driven in said hollow part to cause the insulating sleeve to be gripped between the hollow part and the body piece, one of said parts being the spindle.

2. In a spark-plug, the combination of a body piece having a central opening, a metallic quill passing through said opening, an insulating sleeve surrounding the quill, and a central metallic spindle driven into the quill so as to expand the same to grip the insulating sleeve against the surrounding surface of the opening in the body piece.

3. A spark-plug comprising a shell, a bushing screwed into the shell, a central metallic spindle, a metallic quill about the spindle, and an insulating sleeve about the quill, the portion of the spindle which passes through the bushing being of sufficiently larger diameter than the portion above the bushing to expand the quill to grip the insulating sleeve against the surrounding surface of the bushing as the result of the spindle being driven upward through the quill.

HUGH F. PAYNE.